Jan. 31, 1967
L. J. GEIS
3,301,980
DUAL-ANTICIPATING THERMOSTAT
Filed July 16, 1963
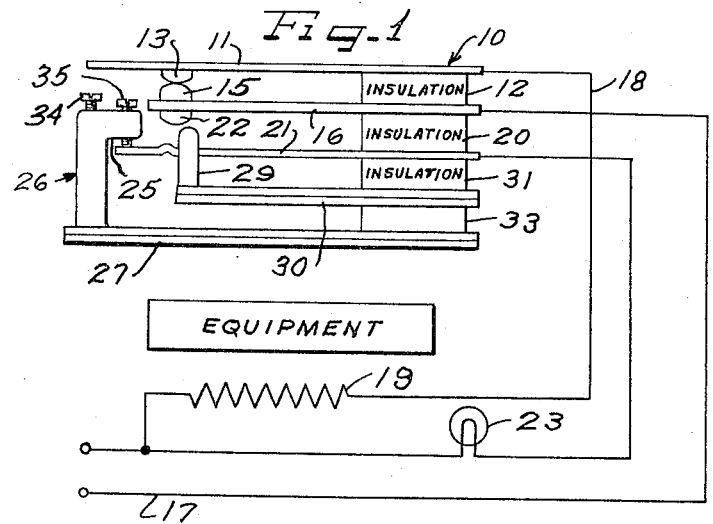
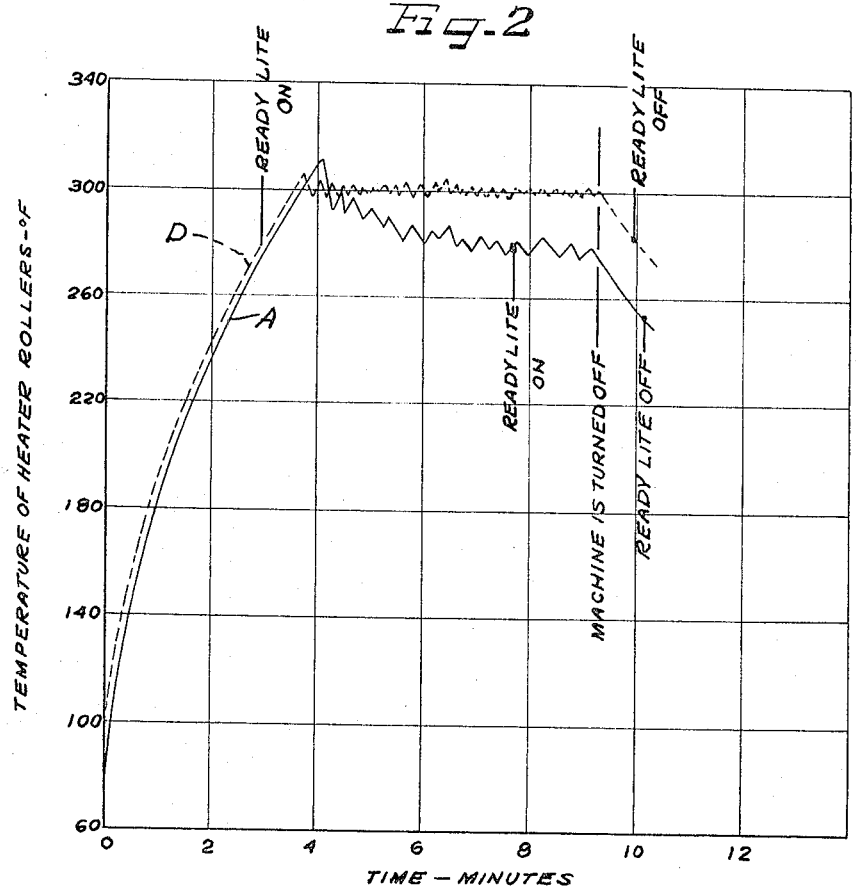
INVENTOR.
Leonard J. Geis
BY
ATTORNEYS

United States Patent Office 3,301,980
Patented Jan. 31, 1967

3,301,980
DUAL-ANTICIPATING THERMOSTAT
Leonard J. Geis, Chicago, Ill., assignor to General Binding Corporation, Northbrook, Ill., a corporation of Illinois
Filed July 16, 1963, Ser. No. 295,321
5 Claims. (Cl. 200—138)

This invention relates to improvements in thermostats and more particularly relates to an improved form of anticipating thermostat.

Heretofore anticipating thermostats have been provided to anticipate temperature rises and to maintain a given temperature and particularly a given output temperature of a heating element and the like.

Such thermostats, however, when set to operate at a predetermined temperature, as for example 280°, overshoot this temperature during warm-up from room temperature to over 300°, with the result that the excess temperature frequently damages or reduces the life of the parts of the system as well as the material under process, or makes it necessary to wait for a stable temperature to be reached before operation of the system, and therefore places a waiting lag before the equipment may be used for processing.

A principal object of the present invention is to improve upon thermostats previously used for controlling heating elements, by so constructing and arranging the thermostat as to prevent overshooting of the temperature to which the thermostat is set.

Another object of the invention is to provide an improved form of anticipating thermostat including a thermally responsive element for controlling heating to a predetermined temperature, in which the tendency of the thermally responsive element to overshoot is balanced by a second thermally responsive element operated in delayed timed relation with respect to the first thermally responsive element.

A further object of the invention is to provide a novel and improved form of anticipating thermostat particularly adapted to control heating of a machine operating on material formed by heating, in which the waiting time for the machine to stabilize to an acceptable temperature for working on the material is substantially minimized over ordinary thermostats.

Still another object of the invention is to improve upon the anticipating thermostats heretofore in use to control the circuits to electric heaters and the like, to maintain the output from the heater at a predetermined temperature, in which a bi-metal thermally responsive element serves to break the circuit to the heater and a second bi-metal thermally responsive element following the first thermally responsive element serves to periodically make the circuit broken by the first bi-metal thermally responsive element, and to thereby balance operation to the first thermally responsive element and prevent overshooting of the thermostat.

These and other objects of the invention will appear from time to time as the following specification proceeds and with reference to the accompanying drawing wherein:

FIGURE 1 is a diagrammatic view of an illustrative form of anticipating thermostat constructed in accordance with the principles of the present invention; and FIGURE 2 is a graph comparing the operation of the anticipating thermostat of the invention with a conventional form of thermostat heretofore used to control the temperature delivered by an electric heater and the like.

In the embodiment of the invention illustrated in the drawing, I have shown a thermostat 10 constructed in accordance with the principles of the present invention and including a resilient switch arm 11 mounted on and extending from an insulator 12 and having a contact 13 adjacent the outer end thereof, adapted to engage a contact 15 on a parallel resilient switch arm 16. The switch arm 15 is mounted on the opposite side of the insulator 12 from the switch arm 11. As the contacts 13 and 15 are in engagement with each other a circuit is completed from a conductor 17 through the contacts 13 and 15 and a conductor 18 through a resistor heater 19, to energize said heater to heat a piece of equipment to perform a work operation on material to be formed or sealed by heat, in a manner which is no part of the present invention, so need not herein be shown or described further.

An insulator 20 is mounted on the bottom of the switch arm 16 and separates said switch arm from a resilient parallel switch arm 21, engageable with a contact 22 on the opposite side of the switch arm 16 from the contact 15, to complete a circuit to a ready light 23 and effect the lighting of said light as an indication the equipment is ready to operate.

The resilient switch arms 11, 16 and 21 may be made from any suitable resilient material which is a good conductor of electricity, one such material being a Phosphor bronze. The switch arms 11 and 16 are normally biased to engage the contacts 13 and 15 with each other while the switch arm 21 is biased to engage the contact 22.

The switch arm 21 is held from engaging the contact 22 by an abutment or shoulder 25 on an actuator 26 engageable with the extreme end portion of the switch arm 11, to separate the contacts 13 and 15. The actuator 26 is mounted on the outer end of a bi-metal thermally responsive element 27 and extends at right angles with respect thereto. The contacts 13 and 15 are closed by an actuator 29 slidably extending through the switch arm 21 and engageable with the contact 22. The actuator 29 is mounted on the end of a bi-metal thermally responsive element 30 and extends upwardly therefrom. The thermally responsive element 30 is separated from the resilient switch arm 21 by an insulator 31. The bi-metal thermally responsive element 27 is separated from the bi-metal thermally responsive element 30 by a metal block 33. The switch arms 11, 16 and 21 and the bi-metal thermally responsive elements 30 and 27 may be suitably mounted on the insulators 12, 20 and 31 and the metal block 33 in a conventional manner, which is no part of the present invention so need not herein be shown or described further.

It will be noted from FIGURE 1 that the thermally responsive element 27 is longer than the thermally responsive element 30 and is closer to the source of heat than the thermally responsive element 30. The thermally responsive element 27, therefore, acts prior to the thermally responsive element 30, a shorter time lag being present when the conductivity of the metal block 33 is high. Also, the thermally responsive element 30 may be made of less active material than the thermally responsive element 27, where the amount of overshoot to be corrected is less. Thus, the design can be varied to suit the characteristics of the equipment to be controlled.

A means may be provided to calibrate the thermostat, to compensate for manufacturing variations, and to vary the timing of the operation of the two thermostats, which is herein shown as being two adjustment screws 34 and 35 threaded in the operator 26. The head of the screw 34 contacts the switch arm 11, while the adjustment screw 35 contacts the switch arm 21.

During operation of the heater 19, as the equipment warms, up the bi-metal thermally responsive element 27 will move toward the switch arm 11 and allow the switch arm 21 to engage the contact 22 by the bias of said switch arm. This will complete a circuit to the ready light 23 and light said light. The ready light 23 may go on at a temperature of 280° as indicated by the broken line in the graph shown in FIGURE 2. As the equipment continues to warm-up to 300° F., the actuator 26 will engage the end of the switch arm 11 and move said switch arm in a direction to break the circuit between the contacts 13 and 15 and deenergize the heater 19.

The equipment will then start to cool down, but the thermally responsive element 27 will be still relatively cool and as this element continues to warm-up and rise a little, it will keep the contacts 13 and 15 separated. The thermally responsive element 30 is now belatedly receiving heat from the warm-up phase, and the actuator 29 on the end of said thermally responsive element moves faster toward the switch arm 16 than the actuator 26 moves in a direction to separate the contacts 13 and 15, with the result that 29 will engage the contact 22 and press the contacts 13 and 15 into engagement with each other and again complete a circuit to the heater, before the equipment temperature can drop more than a few degrees. The thermally responsive element 27 is then heated by the next pulse of heat upon energization of the resistor heater 19 and again opens the circuit through the contacts 13 and 15. The thermally responsive element 30 being heated by this same pulse of heat will again move to close the circuit between the contacts 13 and 15.

It may thus be seen that the thermally responsive element 30 serves to balance the overshoot and to maintain the temperature at a relatively uniform level, and being farther away from the heated equipment than the thermally responsive element 27, acts later than said thermally responsive element and balances the overshoot of the thermally responsive element 27.

In FIGURE 2, the solid line A is a temperature time curve of a conventional thermostat. In operation of equipment controlled by such a thermostat, the thermostat is set for 280° F., but overshoots the setting to approximately 316° F. during warm-up from room temperature. The temperature of the equipment will then drop down to 280°, but it requires a period of almost four minutes from the peak overshot temperature for the operating temperature of the equipment to reach a safe operating temperature, at which time the ready light will go on.

While the temperature could be held to a temperature of 300° by adjusting the thermostat manually from time to time, this is not practical, particularly where the operator of the machine may not have the skill to reliably do this, and with a conventional thermostat it requires close to eight minutes before the ready light will go on and the machine can be operated.

The broken line curve D is a temperature time curve of the dual-anticipating thermostat of the present invention. With this thermostat, the temperature may be set for 300°. The ready light will go on at 280° in a period of three minutes. A substantially uniform temperature of 300° may then be maintained by the alternate making and breaking of the circuit between the contacts 13 and 15, effected by operation of the two thermally responsive elements 27 and 30, until the machine is turned off. When the machine is turned off, the thermally responsive element 27 will cool off and move the operator 26 away from the switch arm 11 and engage the resilient switch arm 21 and shut off the auxiliary circuit before the thermally responsive element 30 can sense that the heat has been shut off. The ready light will thus shut off promptly at 280°.

It may be seen from the foregoing that I have provided a simplified form of thermostat, which cures the problem of overshoot of conventional thermostats, and thereby eliminates excessive temperatures and the liability of damaging parts of the operating equipment or material being processed, and materially reduces the waiting time for the equipment to stabilize and reach a stable temperature before it can be put in operation.

It may further be seen that the problem of overshoot is overcome by the simple expedient of closing the circuit to the heater by a second thermally responsive element, a greater distance away from the source of heat than the main thermally responsive element, which acts alternately with the main thermally responsive element to maintain the temperature at the required stable temperature for operation of the equipment.

It should further be understood that while I have shown the thermally responsive elements as bi-metal elements, that they need not be bi-metal elements, but may be of various other forms desired.

While I have herein shown and described one form in which may invention may be embodied, it may readily be understood that various modifications and variations in the invention may be attained without departing from the spirit and scope of the novel concepts thereof.

I claim as my invention:

1. In a thermostat and in combination with a source of heat, a heating circuit energizing said source of heat and an indicating circuit indicating a predetermined operative temperature range;

two parallel spaced spring switch arms having contacts on the outer ends thereof and biased to effect engagement of said contacts and energization of the heating circuit;

a third spring switch arm engageable with one of said switch arms to complete the indicating circuit and effect indication of a predetermined operative temperature range;

two bi-metal thermally responsive elements;

a first being closer to the source of heat than the second;

the first holding said third spring switch arm from completing the indicating circuit and movable upon predetermined temperature rises to permit said third spring switch arm to complete the indicating circuit;

said first bi-metal thermally responsive element moving to engage one of said switch arms to move said switch arm to separate the contacts and break the heating circuit therebetween upon predetermined temperature rises;

and the second bi-metal thermally responsive element following the first bi-metal thermally responsive element at a greater rate than the rate of travel of the first bi-metal thermally responsive element and engaging a second of said switch arms to periodically engage said contacts and thereby maintain a relatively uniform temperature range.

2. The structure of claim 1, wherein the first bi-metal spring switch arm has an actuator thereon engaged by said third spring switch arm and holding said third spring switch arm from engagement with one of said two spring switch arms and accommodating said third spring switch arm to engage said one of said two switch arms upon predetermined temperature rises to complete the indicating circuit;

and wherein said actuator also engages the other of said two spring switch arms and moves said spring switch arm to break the circuit between said first mentioned contacts.

3. A thermostat comprising:

two aligned parallel spaced first and second spring switch arms having contacts adjacent the outer end portions thereof, engageable with each other by the resiliency of said switch arms;

the first of said switch arms being longer than the second and projecting therebeyond;

a third spring switch arm in alignment with said two spring switch arms and biased to engage said second switch arm;

two bi-metal thermally responsive elements in alignment with each other and with said spring switch arms;

a first having an actuator thereon having an abutment engaged by said third spring switch arm and holding said third spring switch arm out of engagement with said second spring switch arm and accommodating said third spring switch arm to engage said second spring switch arm upon predetermined rise in temperature;

said actuator also having an engaging end portion engaging the projecting end portion of said first spring switch arm to separate said contacts upon continued rises in temperature;

and said second bi-metal thermally responsive element having an actuator thereon engageable with the second of said spring switch arms and movable to move the second of said spring switch arms to engage said contacts as said first mentioned thermally responsive element moves in a direction to disengage said contacts, and cooperating with said first mentioned thermally responsive element to cyclically move said contacts into open and closed positions, to thereby maintain a uniform temperature range throughout the heating cycle.

4. A thermostat particularly adapted to control energization of an electrically energizable source of heat and to control completion of an indicating circuit indicating a predetermined operative temperature comprising:

first and second spring switch arms;

said switch arms having contacts on the outer ends thereof and being biased to engage said contacts;

a third spring switch arm engageable with said second switch arm to complete the indicating circuit to indicate a predetermined operative temperature;

two bi-metal thermally responsive elements;

a first being closer to the electrically energizable source of heat than the second;

an actuator on said first bi-metal thermally responsive element engaged by said third switch arm and holding said third switch arm from moving to complete the indicating circuit, and movable upon increases in temperature of the source of heat, to accommodate said third spring switch arm to complete the indicating circuit;

said actuator also being engageable with said first spring switch arm upon predetermined increases in temperature, to move said first spring switch arm to open said contacts and deenergize the electrically energizable source of heat;

calibrating means on said actuator operable to vary the temperature range of opening and closing of said contacts;

and the second bi-metal thermally responsive element following the first bi-metal thermally responsive element at a greater rate of travel than the rate of travel of the first bi-metal thermally responsive element, and engaging said second switch arm to periodically engage said contacts as said actuator moves to disengage said contacts.

5. The thermostat of claim 4, wherein the calibrating means on said actuator are individual for said first switch arm and said third switch arm to effect calibration of the opening of said contacts by said first bi-metal thermally responsive element and the closing of said contacts by said second bi-metal thermally responsive element.

References Cited by the Examiner

UNITED STATES PATENTS

| | | | |
|---|---|---|---|
| 1,743,053 | 1/1930 | Traver | 200—113 |
| 1,782,045 | 11/1930 | Mason | 236—1 |
| 2,409,420 | 10/1946 | Clark | 219—251 |
| 2,518,503 | 8/1950 | Sparklin | 219—251 |
| 2,742,547 | 3/1956 | Chang-Kaing Tsai | 200—138 |

BERNARD A. GILHEANY, *Primary Examiner.*

L. H. BENDER, *Assistant Examiner.*